(12) United States Patent
Sato

(10) Patent No.: US 7,933,230 B2
(45) Date of Patent: Apr. 26, 2011

(54) DYNAMIC BANDWIDTH SHARING

(75) Inventor: Takashi Sato, Cupertino, CA (US)

(73) Assignee: NXP B.V., Eindhoven (NL)

( * ) Notice: Subject to any disclaimer, the term of this patent is extended or adjusted under 35 U.S.C. 154(b) by 702 days.

(21) Appl. No.: 11/577,309

(22) PCT Filed: Oct. 14, 2005

(86) PCT No.: PCT/IB2005/053383
§ 371 (c)(1),
(2), (4) Date: Mar. 24, 2008

(87) PCT Pub. No.: WO2006/040714
PCT Pub. Date: Apr. 20, 2006

(65) Prior Publication Data
US 2008/0198780 A1    Aug. 21, 2008

Related U.S. Application Data

(60) Provisional application No. 60/619,311, filed on Oct. 14, 2004, provisional application No. 60/657,508, filed on Feb. 28, 2005.

(51) Int. Cl.
*H04B 7/00* (2006.01)

(52) U.S. Cl. ........ 370/310; 370/348; 370/468; 455/266; 455/452.2; 455/454

(58) Field of Classification Search ............... 370/310, 370/468; 455/266, 452.2, 455
See application file for complete search history.

(56) References Cited

U.S. PATENT DOCUMENTS

| 5,485,147 A | 1/1996 | Jaffe et al. |
| 2002/0105970 A1 | 8/2002 | Shvodian |
| 2003/0012176 A1 | 1/2003 | Kondylis et al. |
| 2004/0052274 A1* | 3/2004 | Wang et al. ................ 370/468 |

FOREIGN PATENT DOCUMENTS

| EP | 1 367783 | 12/2003 |
| WO | 0106710 A | 1/2001 |

* cited by examiner

*Primary Examiner* — David Q Nguyen

(57) ABSTRACT

A Dynamic Threshold Rule is provided for sharing of bandwidth of a shared medium between multiple devices. In one embodiment, a device determines a measure of available bandwidth of said medium; reserves bandwidth up to the available bandwidth; receives a request from a device for bandwidth of a specified amount; and honors the request when relinquishing the specified amount results in preserving an equal or greater percentage of bandwidth available at a time of reserving bandwidth. Different classes of devices may be distinguished, where the percentage for devices of a particular class is greater than for devices not of that particular class, or for which at least one class of device is exempt from the requirement to relinquish bandwidth.

15 Claims, 5 Drawing Sheets

| 50% | k=2 | k=2.5 | k=3 | k=3.5 | k=4 | k=4.5 | k=5 | |
|---|---|---|---|---|---|---|---|---|
| | 2 | | | | | | | |
| | 8 | 10 | 13 | 14 | 17 | 18 | 20 | |
| | 105 | 84 | 70 | 60 | 53 | 47 | 42 | |
| | 21.9 - 196.9 | 17.5 - 157.5 | 14.6 - 131.3 | 12.5 - 112.5 | 11.0 - 99.4 | 9.5 - 88.1 | 8.7 - 78.8 | |
| | 105 | | | | | | | |
| | 21.9 - 196.9 | | | | | | | |

FIG. 2

DYNAMIC BANDWIDTH SHARING

CROSS REFERENCE TO RELATED APPLICATION

This application claims the benefit of U.S. provisional application Ser. No. 60/619,311 filed 2004 Oct. 14, and 60/657,508 filed 2005 Feb. 28, which is incorporated herein whole by reference.

The present invention relates to bandwidth sharing by communication devices.

In communication networks, devices are often required to share bandwidth of a shared medium, wired or wireless. One example of such a network is a wireless PAN (personal area network). Such networks are ad hoc, meaning that devices may join the network or leave the network frequently without advance warning. A mechanism is then required to coordinate sharing of the medium—in this instance wireless spectrum. The same problem occurs to various degrees in various different types of networks.

A particular challenge arises in balancing fair access (i.e., avoiding greedy device behavior) against quality of service requirements. In one proposed solution, a single device is allowed to occupy up to half of the total bandwidth of the medium. Under this arrangement, two devices can together monopolize the total bandwidth of the medium to the exclusion of all other devices. Service availability therefore suffers.

The present invention, generally speaking, provides for sharing of bandwidth of a shared medium between multiple devices. In one embodiment, a device determines a measure of available bandwidth of said medium; reserves bandwidth up to the available bandwidth; receives a request from a device for bandwidth of a specified amount; and if available bandwidth is insufficient to satisfy the request, relinquishes any bandwidth in excess of a percentage of bandwidth available at a time of reserving bandwidth. Different classes of devices may be distinguished, where the percentage for devices of a particular class is greater than for devices not of that particular class, or for which at least one class of device is exempt from the requirement to relinquish bandwidth.

The present invention may be more fully understood from the following description in conjunction with the appended drawing. In the drawing:

FIG. 2 is a table comparing the Dynamic Threshold Rule with a 50% Fixed Rule.

FIG. 6 is a flowchart illustrating steps for performing bandwidth sharing in accordance with the Dynamic Threshold Rule.

Figure 1:
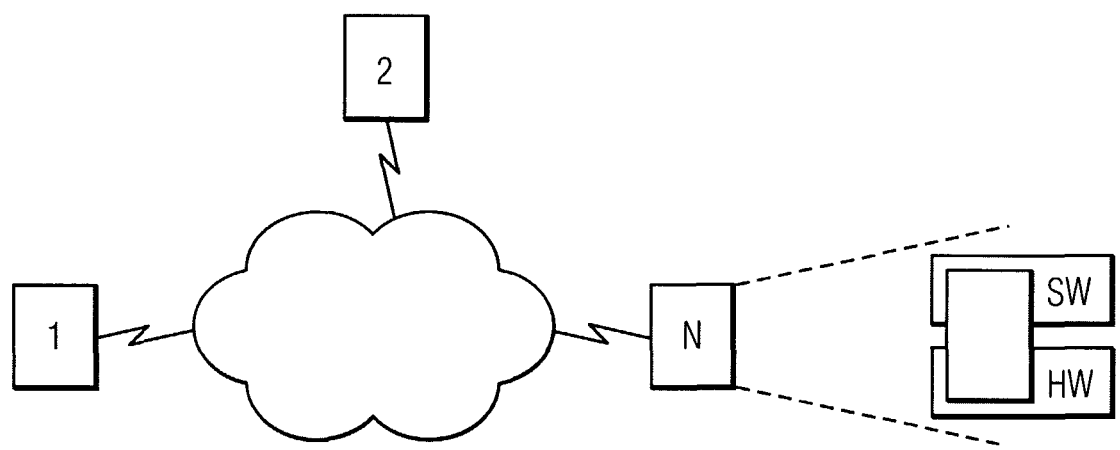
FIG. 1 is a block diagram of a system in which the present invention may be used.

Referring now to FIG. 1, a block diagram is shown of an exemplary system in which the present invention may be used. A number of devices, in this case wireless PAN devices, share a medium, in this case wireless spectrum. Further details of a device are shown. The device includes a hardware subsystem and a software subsystem. A medium access controller (MAC) controls access of the device to the shared medium. In the case of a wireless PAN device, the MAC may be of a type specified in the standard IEEE 802.13.3a, for example. Typically, the MAC will be realized in a combination of hardware and software.

In order to overcome service availability limitation as described above, a Dynamic Threshold Rule is used to control medium access. In accordance with this rule, a device running an asynchronous application shall honor a Medium Access Slot (MAS) relinquishment request from other devices if a resulting MAS reservation would still be greater than or equal to a MAS_hold_threshold, define as follows:

MAS_hold_threshold=roundup(MAS_that_were_available_when_the_reservation_was_made/$k$)

Otherwise, the device may reject the request. (Note that a device may reject the request regardless of its MAS_hold_threshold if it is an isochronous device.) In accordance with the foregoing rule, a device is guaranteed at least 1/k of the available MAS when it made the reservation.

The following example will illustrate application of the Dynamic Threshold Rule with k=2. At the outset, the medium is unused. Device A therefore grabs 210 MAS (100%). At this point in time, the MAS_hold_threshold for Device A is set to 105. Some time later, Device B asks Device A for 105 MAS. Since the MAS relinquishment request from Device B would result in a MAS reservation for Device A that would still be greater than or equal to Device A's MAS_hold_threshold, Device A must comply and release 105 MAS to Device B. Device A therefore holds 105 MAS and Device B holds 105 MAS. At this point in time, the MAS_hold_threshold for Device B is set to 53. Later, Device C asks Devices A and B for 52 MAS. Device A may reject the request, as relinquishing additional MAS would bring it below its MAS_hold_threshold. Device B, however, must comply. Device A therefore holds 105 MAS, Device B holds 53 MAS, and Device C holds 52 MAS. At this point in time, the MAS_hold_threshold for Device C is set to 26.

Additional examples of the operation of the Dynamic Threshold Rule are set forth in the following tables:

TABLE 1

Eight devices can share the bandwidth (k = 2)

| DEVICE | MAS, INITIAL | MAS, AT EQUILIBRIUM |
|---|---|---|
| A | 105-210 | 105 |
| B | 53-105 | 53 |
| C | 26-52 | 26 |
| D | 13-26 | 13 |
| E | 7-13 | 7 |
| F | 3-6 | 3 |
| G | 2-3 | 2 |
| H | 1 | 1 |

TABLE 2

Eight devices can share the bandwidth (k = 2)

| DEVICE | MAS, INITIAL | MAS, AT EQUILIBRIUM |
|---|---|---|
| A | 90 | 90 |
| B | 60-120 | 60 |
| C | 30-60 | 30 |
| D | 15-30 | 15 |
| E | 8-15 | 8 |
| F | 4-7 | 4 |
| G | 2-3 | 2 |
| H | 1 | 1 |

TABLE 3

Nine devices can share the bandwidth (k = 2)

| DEVICE | MAS, INITIAL | MAS, AT EQUILIBRIUM |
|---|---|---|
| A | 70 | 70 |
| B | 70-140 | 70 |
| C | 35-70 | 35 |
| D | 18-35 | 18 |
| E | 9-17 | 9 |
| F | 4-8 | 4 |
| G | 2-4 | 2 |
| H | 1-2 | 1 |
| I | 1 | 1 |

TABLE 4

Eight devices can share the bandwidth (k = 2)

| DEVICE | MAS, INITIAL | MAS, AT EQUILIBRIUM |
|---|---|---|
| A | 120 (non-scalable isochronous) | 120 |
| B | 45-90 | 45 |
| C | 23-45 | 23 |
| D | 11-22 | 11 |
| E | 6-11 | 6 |
| F | 3-5 | 3 |
| G | 1-2 | 1 |
| H | 1 | 1 |

TABLE 5

Ten devices can share the bandwidth (k = 2.5)

| DEVICE | MAS, INITIAL | MAS, AT EQUILIBRIUM |
|---|---|---|
| A | 84-210 | 84 |
| B | 51-126 | 51 |
| C | 30-75 | 30 |
| D | 18-45 | 18 |
| E | 11-27 | 11 |
| F | 7-16 | 7 |
| G | 4-9 | 4 |
| H | 2-5 | 2 |
| I | 2-3 | 2 |
| J | 1 | 1 |

TABLE 6

Thirteen devices can share the bandwidth (k = 3)

| DEVICE | MAS, INITIAL | MAS, AT EQUILIBRIUM |
|---|---|---|
| A | 70-210 | 70 |
| B | 47-140 | 47 |
| C | 31-93 | 31 |
| D | 21-62 | 21 |
| E | 14-41 | 14 |
| F | 9-27 | 9 |
| G | 6-18 | 6 |
| H | 4-12 | 4 |
| I | 3-8 | 3 |
| J | 2-5 | 2 |
| K | 1-3 | 1 |
| L | 1-2 | 1 |
| M | 1 | 1 |

Figure 3:
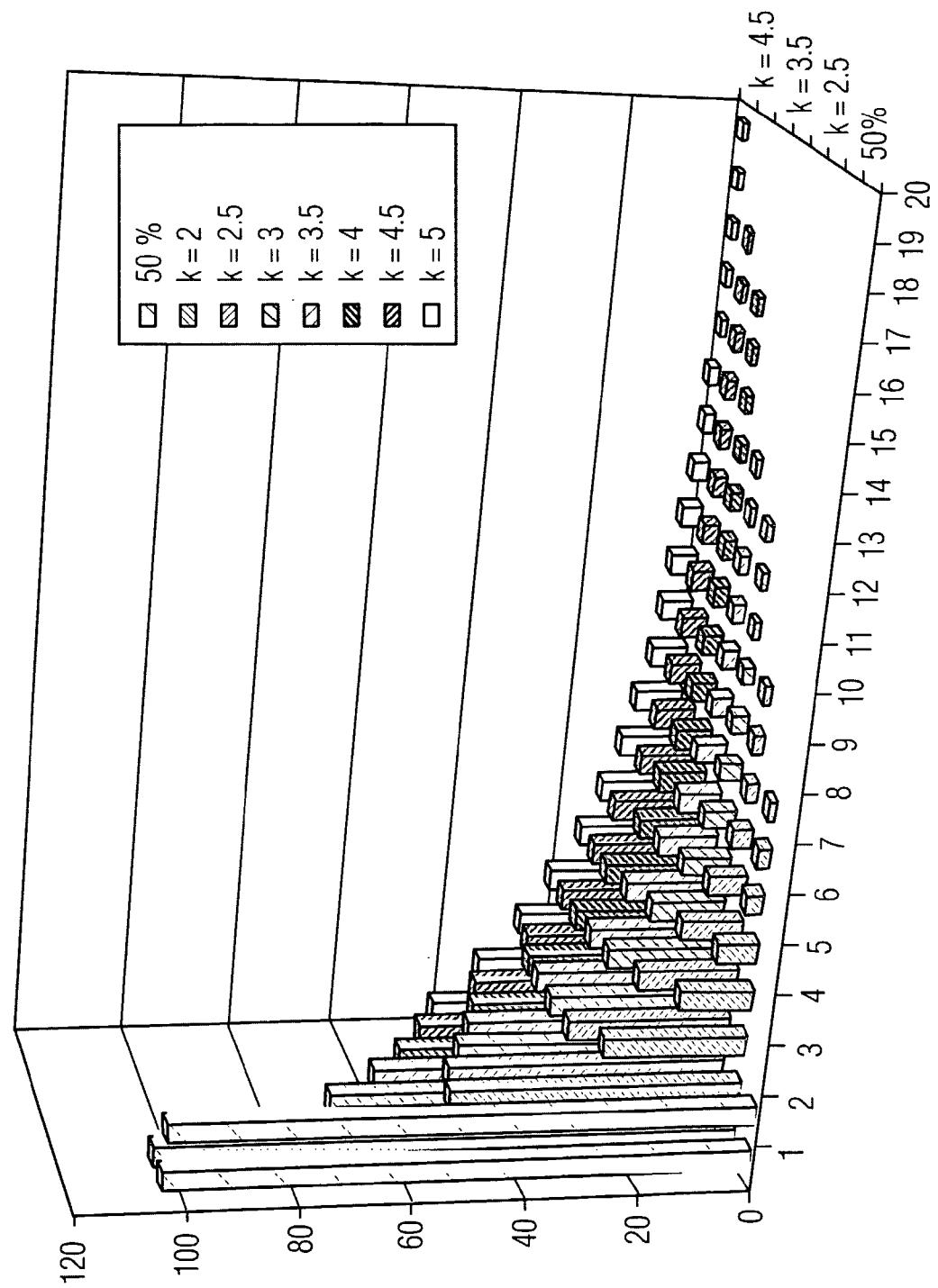
FIG. 3 is a graph illustrating operation of the Dynamic Threshold Rule as a function of k.

Referring to FIG. 2, is a table is shown comparing the Dynamic Threshold Rule with a 50% Fixed Rule. It may be seen that the Dynamic Threshold Rule allows more applications to share the bandwidth compared to the 50% rule, which does not guarantee even the 3rd reservation. FIG. 3 is a graph illustrating operation of the Dynamic Threshold Rule as a function of k.

Figure 4:
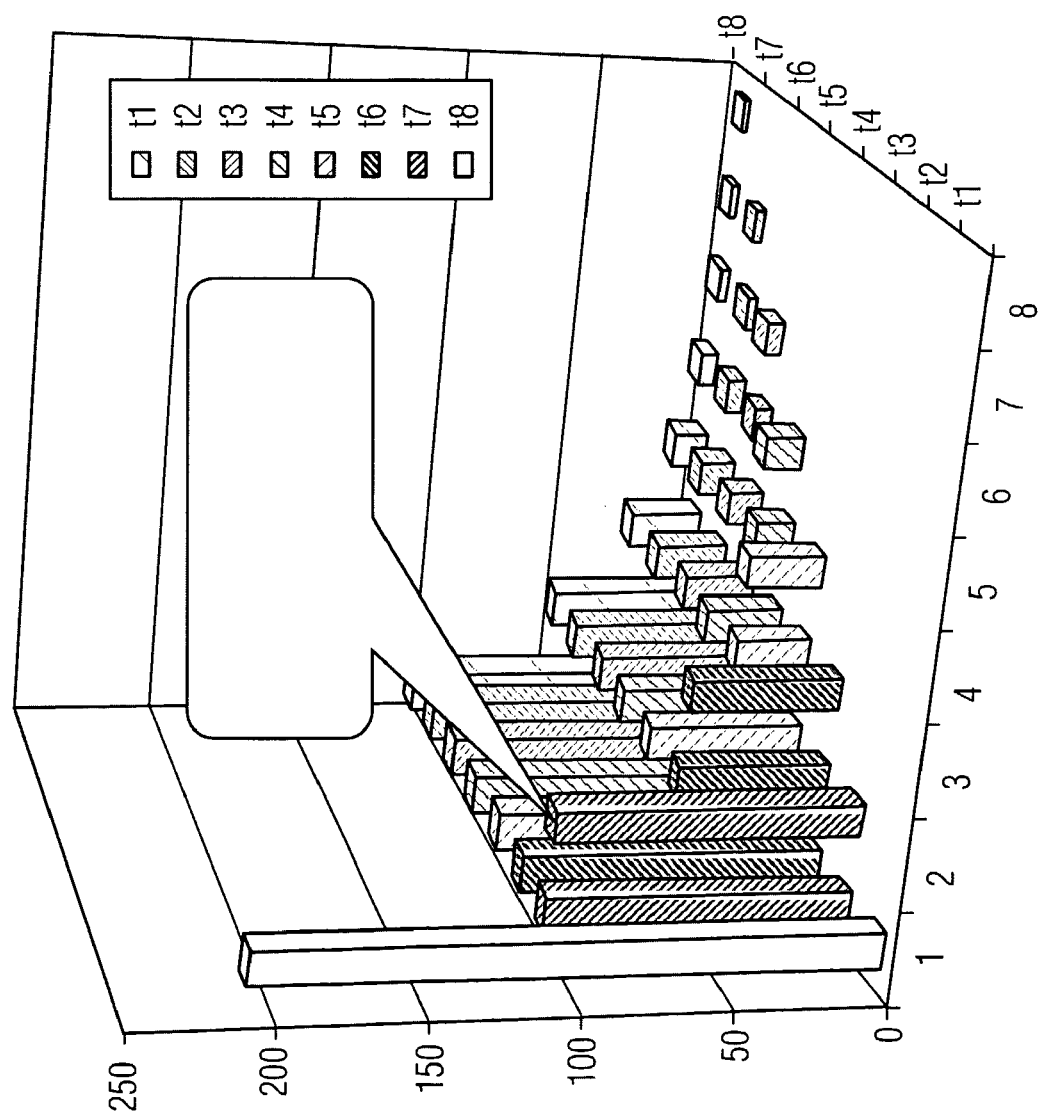
FIG. 4 is a graph illustrating operation of the Dynamic Threshold Rule for k=2.
Figure 5:
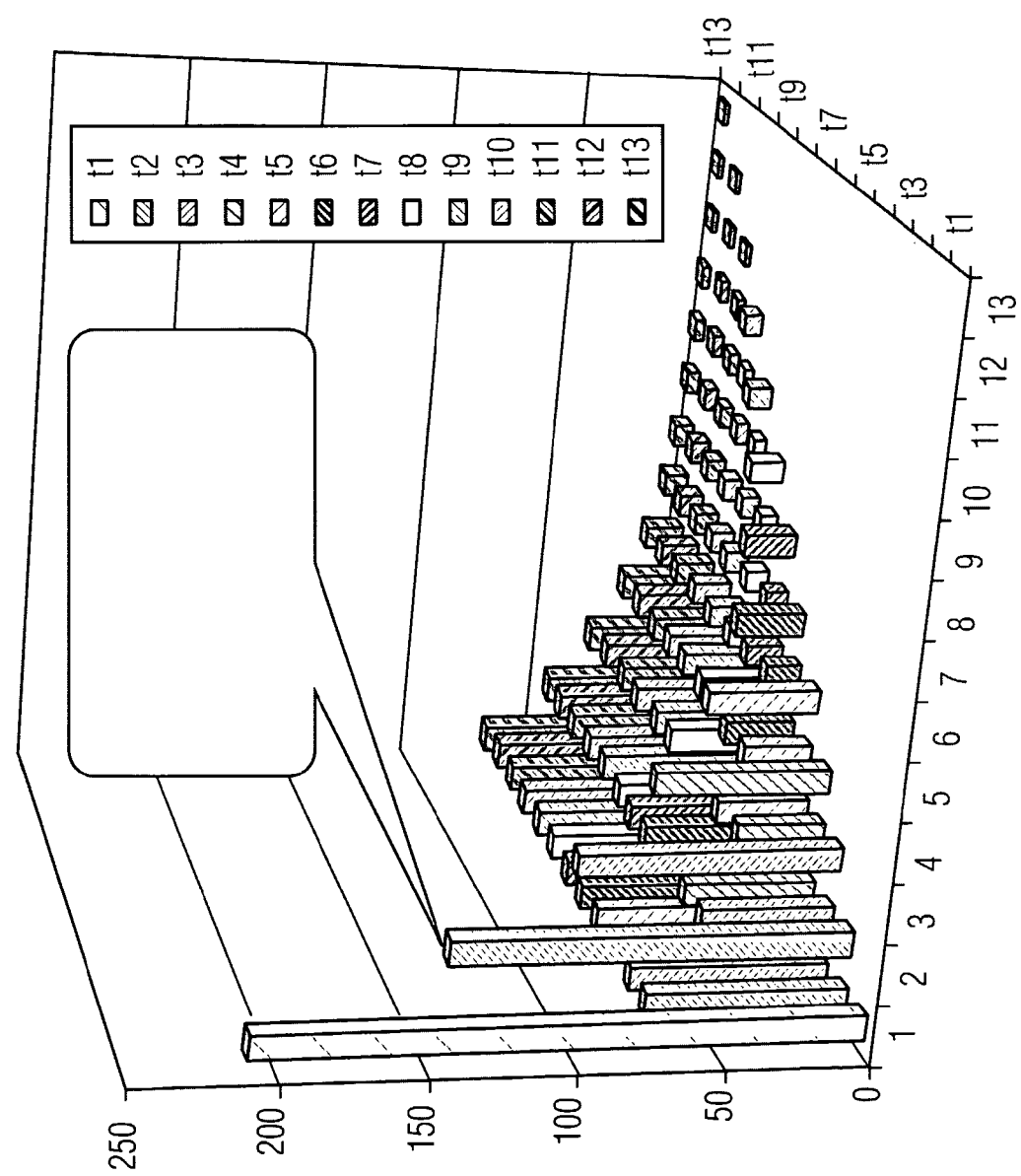
FIG. 5 is a graph illustrating operation of the Dynamic Threshold Rule for k=3.

The properties of the Dynamic Threshold Rule may be changed by changing the value of k. FIG. 4 is a graph illustrating operation of the Dynamic Threshold Rule for k=2. FIG. 5 is a graph illustrating operation of the Dynamic Threshold Rule for k=3. When k=2 (FIG. 4), a new reservation cannot reserve a bigger MAS than the previous reservation. When k>2 (FIG. 5), a new reservation has a temporary advantage in that it can temporarily reserve a bigger MAS than the previous reservation, which is not objectionable in principle.

As alluded to previously, different class of devices may be established with different rules pertaining to different classes of devices. In one embodiment, two devices classes are established, non-scalable isochronous devices and other devices. In this embodiment, isochronous devices are not required to relinquish bandwidth. In other embodiments, a class of devices may be required to relinquish bandwidth but may be allowed to retain a greater percentage of bandwidth than another class of devices.

FIG. 6 is a flowchart illustrating steps for performing bandwidth sharing in accordance with the Dynamic Threshold Rule. A Dynamic Threshold Rule is provided for sharing of bandwidth of a shared medium between multiple devices. In a first step, a device determines a measure of available bandwidth of said medium (601). Next, the device reserves bandwidth up to the available bandwidth (603). Thereafter, the device receives a request from another device to relinquish bandwidth (605). If the request satisfies the dynamic threshold rule as described (607), the device relinquishes any bandwidth in excess of a percentage of bandwidth available at a time of reserving bandwidth (609). Different classes of devices may be distinguished, where the percentage for devices of a particular class is greater than for devices not of that particular class. Alternatively, one or more classes of devices may be exempt from the requirement to relinquish bandwidth.

A number of modifications may be applied to further enhance operation of the Dynamic Threshold Rule. For example, by each device making its MAS_hold_threshold value visible/accessible to other devices, bandwidth sharing procedures and interactions may be streamlined. A non-scalable isochronous application would set its MAS_hold_threshold to what it needs. Certification testing is made easier if these values are accessible.

Additional rules may be applied to avoid "Tugs of War" over MAS reservation. One such rule is that a MAS relinquishment request shall be sent only when necessary to make room for a new reservation, never for augmenting an existing reservation. An exception to this rule may be made in the instance that a device has not relinquished any of its reservation during the past one minute. That is, a device may make an additional MAS reservation to augment the existing reservation (without changing the MAS_hold_threshold value) only if it has not relinquished any of its reservation during the past one minute.

To promote fairness, uncompressed video streams are strongly discouraged. In one embodiment, they are treated as scalable isochronous applications and required to abide by the Dynamic Threshold Rule.

To further promote fairness, a certification lab or the like may, during certification testing, measure properties such as the following and issue a request for improvement in the case of "obviously greedy" or "obviously inefficient" devices: over-allocation ratio (MAS reserved and not released vs.

MAS actually used over a period of time); in the case of wireless media, radio performance & proper rate control (i.e., physical layer (PHY) rate vs. distance in controlled environments); MAS release time (how soon MAS are released when an application is stopped or becomes idle); MAS relinquishment response time (how soon MAS are released when a device receives a valid MAS relinquishment request); etc.

Fairness promoting measures may include user intervention. For example, a device operating at the lowest PHY (physical layer) data rate(s) may be required to display a warning sign (e.g., blinking LED in a somewhat annoying manner) to indicate that it is operating at a bad efficiency level and psychologically pressure the user to rearrange the settings (e.g., move devices closer) to eliminate the warning. This measure may be expected to lead to a higher PHY data rate, more efficient data transmission, and fairer usage of the bandwidth.

It will be appreciated by those or ordinary skill in the art that the invention can be embodied in other specific forms without departing from the spirit or essential character thereof. The disclosed embodiments are therefore intended in all respects to be illustrative and not restrictive. The scope of the invention is indicated by the appended claims rather than the foregoing description, and all changes which fall within the meaning and range of equivalents thereof are intended to be embraced therein.

What is claimed is:

1. A method of sharing bandwidth of a shared medium between multiple devices, comprising a first device performing the steps of:
   determining a measure of available bandwidth of said medium that is not reserved for other devices;
   reserving, for use by the first device, bandwidth up to the available bandwidth;
   determining a threshold bandwidth by applying a threshold percentage to the available bandwidth that is not reserved for other devices;
   receiving a request from a second device to relinquish an amount of the bandwidth of said medium;
   determining whether the requested amount of the bandwidth of said medium exceeds the threshold bandwidth, and
   relinquishing, in response to determining that the requested amount is less than the threshold, bandwidth in excess of the threshold bandwidth.

2. The method of claim 1, further comprising distinguishing different classes of devices, where said percentage for devices of a particular class is greater than for devices not of said particular class.

3. The method of claim 1, further including the second device performing a step of determining another threshold bandwidth as a function of the threshold percentage and amount of bandwidth in excess of the threshold bandwidth of the first device.

4. The method of claim 1, further comprising distinguishing different classes of devices, wherein devices of a particular class are not required to relinquish bandwidth.

5. The method of claim 1, further comprising detecting transmission at a low rate inconsistent with efficient bandwidth usage and producing a user alert for so long as transmission at said low rate continues.

6. The method of claim 1, wherein said percentage of bandwidth available at a time of said reserving bandwidth is a hold threshold representing how much bandwidth a device is entitled to, further comprising a device making its hold threshold accessible to other devices.

7. The method of claim 1, wherein a request to relinquish bandwidth is only allowed to be made on behalf of a new application not then using bandwidth.

8. The method of claim 1, wherein a request to relinquish bandwidth is only allowed to be made on behalf of a new application not then using bandwidth or in a circumstance in which a device making the request to relinquish bandwidth has not itself been requested to relinquish bandwidth for a measured period of time.

9. A method of sharing bandwidth of a shared medium between multiple devices, comprising a device performing the steps of:
   determining a measure of available bandwidth of said medium;
   reserving, for use by the device, bandwidth up to the available bandwidth;
   receiving a request from another device to relinquish an amount of the bandwidth of said medium;
   relinquishing any bandwidth in excess of a percentage of bandwidth available at a time of said reserving bandwidth; and
   distinguishing different classes of devices, wherein devices of a particular class are not required to relinquish bandwidth and wherein said devices of said particular class are isochronous devices.

10. A device for communicating using a medium shared between multiple devices, comprising:
    circuitry
       for determining a measure of available bandwidth of said medium;
       for reserving, for use by the device, bandwidth up to the available bandwidth;
       for receiving a request from another device to relinquish bandwidth;
       for determining a threshold bandwidth amount by applying a threshold percentage to the available bandwidth that is not reserved for other devices; and
       for relinquishing a specified amount of bandwidth in response to determining that relinquishing the specified amount of bandwidth will preserve an amount of bandwidth, for use by the device, that is equal or greater percentage of the threshold bandwidth amount.

11. The device of claim 10, further comprising circuitry for distinguishing said device as being of one of multiple different classes of devices, where said percentage for devices of a particular class is greater than for devices not of said particular class.

12. The device of claim 11, wherein said percentage for devices of said particular class is 100%.

13. A device for communicating using a medium shared between multiple devices, comprising: means for determining a measure of available bandwidth of said medium; means for reserving bandwidth up to the available bandwidth; means for receiving a request from a device to relinquish bandwidth; means for relinquishing a specified amount of bandwidth when doing so results in preserving an equal or greater percentage of bandwidth available at a time of said reserving bandwidth; means for distinguishing said device as being of one of multiple different classes of devices, and circuitry for distinguishing different classes of devices, wherein devices of a particular class are not required to relinquish bandwidth.

14. The device of claim 13, wherein said devices of said particular class are isochronous devices.

15. The method of claim 14, wherein isochronous devices that transmit uncompressed video information are not exempt from relinquishing bandwidth.

* * * * *